Sept. 15, 1959     K. W. BOSSARTE     2,904,774
AUTOMOBILE HAND BRAKE WARNING SYSTEM
Filed July 1, 1957

INVENTOR.
Keith W. Bossarte
His Attorney

United States Patent Office 2,904,774
Patented Sept. 15, 1959

2,904,774

AUTOMOBILE HAND BRAKE WARNING SYSTEM

Keith W. Bossarte, San Francisco, Calif.

Application July 1, 1957, Serial No. 669,354

6 Claims. (Cl. 340—52)

The invention relates to electric control or signal circuits employed in automobiles, such as brake light circuits and the like.

An object of the present invention is to provide a warning signal circuit of the character described which is particularly adapted for use with automobiles having automatic transmissions and in which the circuit discriminates between the neutral and in-gear positions of the transmission and the idle and running conditions of the engine to supply a warning signal when the hand brake of the automobile is set but only under a combination of conditions when such a signal is desired.

Another object of the present invention is to provide a warning signal circuit of the character above which requires the addition of a minimum number of parts which work cooperatively with the conventional automotive parts to produce the improved warning system of the present invention and wherein all of the parts may be simply and ruggedly constructed and connected to insure long and troublefree life for the system.

A further object of the present invention is to provide a warning signal system of the character described which may include a low-pressure oil switch connected with the other parts so as to render the circuit responsive to a drop in engine oil pressure under normal over-the-road in-gear running of the automobile.

The invention possesses other objects and features of advantage, some of which, with the foregoing, will be set forth in the following description of the preferred form of the invention which is illustrated in the drawings accompanying and forming part of the specification. It is understood, however, that variations in the showing made by the said drawings and description may be adopted within the scope of the invention as set forth in the claims.

Referring to said drawing (one sheet):

Figure 1:
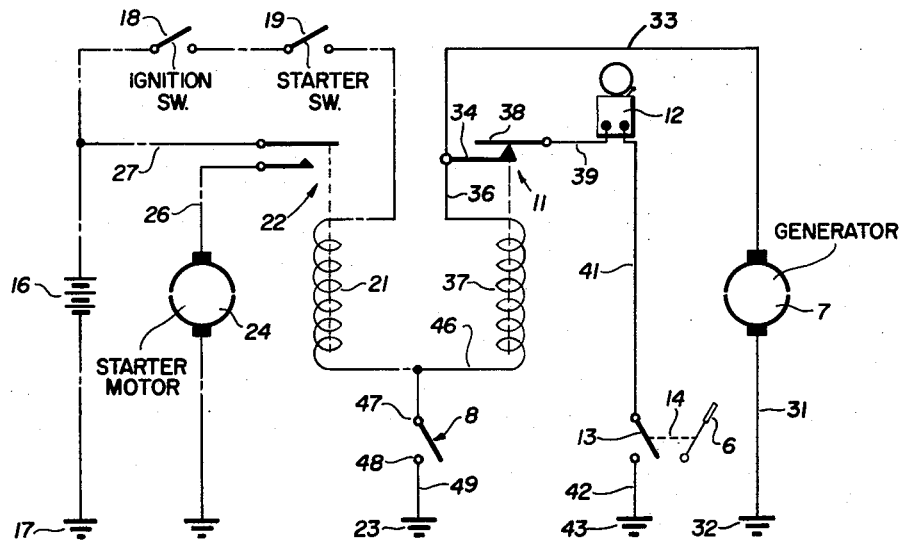
Figure 1 is a schematic wiring diagram of an automobile hand brake warning system constructed in accordance with the present invention.

The hand brake warning system of the present invention is designed for use with automobiles having a hand brake 6, a generator 7 and an automatic transmission provided with a neutral ground switch 8, and consists, briefly, of a signal circuit as depicted in the accompanying drawing which is adapted for connection to the generator 7 and includes a normally closed relay 11, an electric signal device 12, and a switch 13 which is adapted for connection by connection means 14, shown diagrammatically, to the hand brake 6 for closing and opening on setting and releasing, respectively, of the hand brake, the relay 11 being also designed for connection to the neutral ground switch 8 and being responsive to the closing of this switch in the neutral position of the transmission to open the signal circuit, the neutral ground switch being opened in the normal in-gear running operation of the automobile so as to restore the control of the signal circuit under such circumstances to the hand brake switch 13.

The conventional electric circuitry of the automobile also makes use of the transmission neutral ground switch 8 in preventing the starting of the engine when the transmission is in gear and permitting the engine starter to function only in the neutral position of the transmission. This conventional ignition starter and automatic transmission circuit does not of course form any part of the present invention except in the common use of the transmission neutral ground switch 8, and is shown for clarity of understanding in dotted lines in the drawing. This circuit includes the automobile storage battery 16 which is shown connected at one side to ground 17 and at its other side to the ignition switch 18, the starter switch 19, solenoid winding 21 of the starter relay switch 22, and then through the transmission neutral ground switch 8 to ground 23 to complete the circuit. As will be understood, switch 8 is closed in the neutral position of the transmission and is open in the in-gear running position of the transmission. Accordingly when switch 8 is closed, the starter relay switch 22 may be energized by closing the ignition switch 18 and the starter switch 19, so as to connect the starter motor 24 by direct jumpers 26 and 27 to the battery 16. On the other hand when the transmission is in an in-gear position, switch 8 will be open, and closing of the ignition switch 18 and starter switch 19 will not complete the circuit to the starter relay switch 22.

In the present warning system advantage is taken of the fact that the generator 7 is motor-driven and has a variable voltage output which is relatively low during idling of the engine and relatively high during running of the engine, so as to energize the warning signal device 12 only when the engine is running at higher r.p.m.'s. Even in this case, means is provided, here in the form of the relay 11, and which is connected to the neutral ground switch and is responsive to the closing thereof in the neutral position of the transmission so as to prevent the application of the wiring and normally effective operating voltage of the generator to the signal device. More specifically, the foregoing is accomplished by designing the relay 11 to function when energized at and above a critical voltage intermediate the idle and running voltages of the generator, and the designing of the signal device 12 to have an operating voltage which is intermediate the critical voltage of the relay and the running voltage of the generator.

Various forms of electric signal devices may be used, such as a signal light, buzzer or the like. I prefer a buzzer as being more effective in its attention-getting properties than a signal light and there is little difficulty in designing and setting the buzzer to sound only at or above a critical voltage. For example, in a 12-volt automobile electric system, the buzzer may be designed and set to operate at and above, say, 10 volts. The generator 7 will put out about one volt when the engine is idling and its output voltage picks up rapidly with engine speed to about 12 to 14 volts. In such an arrangement I design and set the relay 11 to operate at about nine volts so that it is in the upper range of the generator voltage but below the critical voltage of the signal device 12.

In the electric circuit illustrated in the accompanying drawing, generator 7 is connected at one side by conductor 31 to ground 32, and at its other side by conductor 33 to one of the normally closed relay contacts 34, a connection 36 being also made at this point of the circuit to one end of the solenoid or field winding 37 of the relay 11. The other relay contact 38 is connected by conductor 39 to one side of the signal device 12, and the other side of this device is connected by conductor 41 to one terminal of the hand brake switch 13 which is in turn connected by conductor 42 to ground 43 so as to complete the electric circuit from the generator through normally closed relay contacts 34 and 38, the signal device 12, and the hand brake switch 13. As will be observed in the drawing, the field winding 37 is connected in series with the generator 7 and the neutral ground switch 8, and appropriate energizing of the field winding as above discussed will effect the opening of contacts 34 and 38. This latter circuit includes the conductor 33 and connection 36 above mentioned and which brings current to one end of the winding and conductor 46 which is connected to the other end of the winding and to one terminal 47 of the transmission neutral ground switch 8, the opposite terminal 48 of this switch being connected by conductor 49 to ground 23 as above described in connection with the ignition and starter circuit.

The operation of the system will be understood from the foregoing and may be briefly summarized as follows:

When the transmission is in neutral position, switch 8 will be closed and the engine may be started. Assuming the hand brake 6 is set and hand brake switch 13 is closed, ensuing idling of the engine will cause a current to flow from generator 7 through the normally closed relay contacts 34 and 38 and through the signal device 12. However as above noted, device 12 is set so as not to sound or give its signal at the normally low idle voltage of the generator. Under the circumstances mentioned it will also be observed that current can flow through the parallel circuit including the relay field winding 37 and the closed transmission switch 8. However, here again the relay is designed and set to remain closed at this idle voltage. Should the engine be speeded up with the transmission remaining in neutral position, the lower operating voltage of relay 11 will cause it to open the circuit to the buzzer 12 before the latter with its higher operating voltage will sound. However if the transmission is put in gear and the engine so speeded up, the field winding circuit of the relay is opened and the full running generator voltage is applied to the buzzer 12, assuming that the hand brake remains set, thus causing the buzzer to sound.

Figure 2:
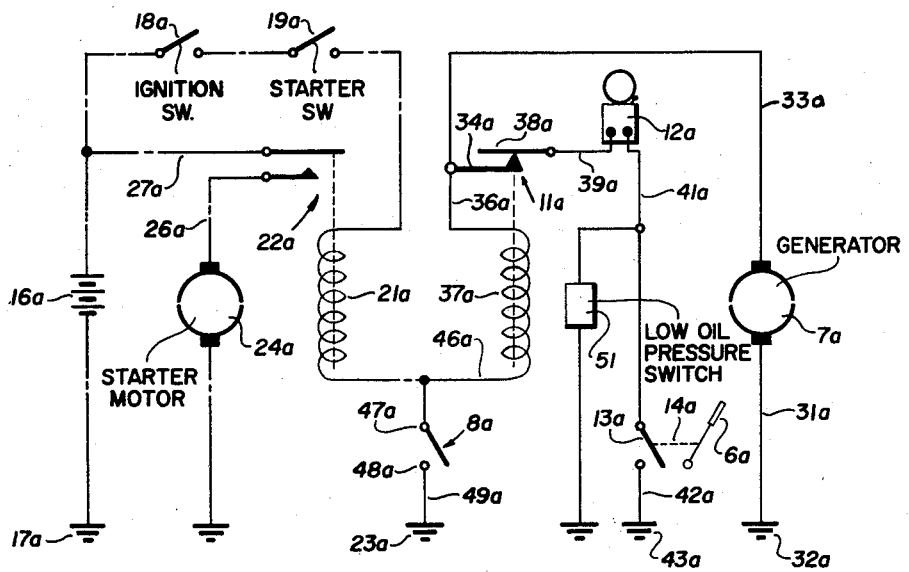
Figure 2 is a schematic wiring diagram similar to Figure 1 but including a low-pressure oil switch in the circuitry.

A modified form of the invention is illustrated in Figure 2 of the drawing wherein a pressure-responsive switch 51 is connected in the signal circuit in parallel with the hand brake switch 13a. Pressure switch 51 is designed for connection to the engine oil pressure line so as to open and close in response to relatively high and low engine oil pressures, respectively. In this manner the opening of the neutral ground switch 8a in the in-gear running operation of the automobile will render the signal circuit responsive to a drop in oil pressure. Other than as described above, the remaining parts in this warning system are identical to the parts in the first described system, and the description of these first mentioned parts is here incorporated by reference into the modified warning system, and the corresponding parts in the modified system are so denoted by the addition of the letter "a" to the same number used to identify the corresponding part in the first described system.

I claim:

1. A hand brake warning system for automobiles comprising in combination with a hand brake and a generator and an automatic transmission provided with a neutral ground switch, a signal circuit connected to said generator and including a normally closed relay and an electric signal device and a switch connected to said hand brake for closing and opening upon setting and releasing respectively of said hand brake, said relay being connected to said neutral ground switch and being responsive to the closing thereof in the neutral position of the transmission to open said signal circuit, said neutral ground switch being open in the normal in-gear running operation of the automobile so as to restore the control of said signal circuit to said hand brake switch.

2. A warning system for automobiles as characterized in claim 1 and having a pressure-responsive switch connected in said signal circuit in parallel with said hand brake switch and being adapted for connection to the engine oil pressure line to open and close in response to relatively high and low engine oil pressures, whereby upon opening of said neutral ground switch in the in-gear running operation of the automobile said signal circuit will be responsive to a drop in engine oil pressure.

3. A warning system for automobiles comprising in combination with having a hand brake and motor-driven generator providing relatively low and high idle and running voltages and an automatic transmission provided with a neutral ground switch, a switch connected to said hand brake for closing and opening upon setting and releasing respectively of said hand brake, an electric signal device connected to said hand brake switch and said generator and having an operating voltage intermediate said idle and running voltages, and means connected to said neutral ground switch and responsive to the closing thereof for preventing the application of said operating voltage to said signal device.

4. A warning system for automobiles as characterized in claim 3 wherein said means is composed of a relay connected to said signal device and to said generator and having an operating voltage less than said operating voltage of said signal device.

5. A hand brake warning system for automobiles comprising in combination with a hand brake and a generator providing relatively low and high idle and running voltages and an automatic transmission provided with a neutral ground switch, a switch connected to said hand brake for closing and opening upon setting and releasing respectively of said hand brake, a relay having normally closed contacts and a field winding connected in series with said generator and neutral ground switch and functioning to open said contacts when energized at and above a critical voltage intermediate said idle and running voltages of said generator, and an electric signal device connected in series with said generator and contacts and hand brake switch and having an operating voltage intermediate said critical and running voltages.

6. A warning system for automobiles comprising in combination with a hand brake, and motor-driven generator providing relatively low and high idle and running voltages and an automatic transmission provided with a neutral ground switch closed in the neutral and opened in the in-gear positions of said transmission, a relay having normally closed contacts and a field winding for opening said contacts when energized at and above a critical voltage intermediate said idle and running voltages, an electrically operated signal device having an operating voltage intermediate said critical and running voltages, and a hand brake switch connected to the hand brake for closing said hand brake switch upon setting said hand brake and opening said hand brake switch upon releasing said hand brake, the parts being connected in a first electric series circuit including said field winding and generator and neutral ground switch and a second electric series circuit including said contacts and signal device and hand brake switch with said second circuit connected in parallel to said field winding and neutral ground switch.

References Cited in the file of this patent

UNITED STATES PATENTS

| | | |
|---|---|---|
| 2,511,631 | Gordon | June 13, 1950 |
| 2,740,947 | Davies | Apr. 3, 1956 |
| 2,788,514 | Schmitt | Apr. 9, 1957 |